United States Patent
Takada

(10) Patent No.: US 6,210,567 B1
(45) Date of Patent: Apr. 3, 2001

(54) FILTRATION DEVICE FOR TANK WATER FOR AQUARIUM FISH

(76) Inventor: Shunsuke Takada, 22-5, Kakinokizaka 1-chome, Meguro-ku, Tokyo (JP)

( * ) Notice: Subject to any disclaimer, the term of this patent is extended or adjusted under 35 U.S.C. 154(b) by 0 days.

(21) Appl. No.: 09/254,393

(22) PCT Filed: Aug. 29, 1997

(86) PCT No.: PCT/JP97/03025

§ 371 Date: Jun. 14, 1999

§ 102(e) Date: Jun. 14, 1999

(87) PCT Pub. No.: WO98/09509

PCT Pub. Date: Mar. 12, 1998

(30) Foreign Application Priority Data

Sep. 9, 1996 (JP) .................................................. 8/260205

(51) Int. Cl.[7] .................................................. A01K 63/04
(52) U.S. Cl. ..................... 210/169; 210/252; 210/282; 210/287; 210/336; 119/227; 119/260
(58) Field of Search ........................ 210/169, 201–203, 210/252, 258, 282, 287, 314, 336, 416.2; 119/227, 259, 260

(56) References Cited

U.S. PATENT DOCUMENTS

| | | | |
|---|---|---|---|
| 119,189 | * | 9/1871 | Simonson . |
| 1,450,770 | * | 4/1923 | Frick et al. . |
| 3,669,297 | * | 6/1972 | Willinger . |
| 3,768,651 | * | 10/1973 | Streeter . |
| 3,768,652 | * | 10/1973 | Jardim . |
| 3,892,663 | * | 7/1975 | Wiedenmann . |
| 3,957,634 | * | 5/1976 | Orensten et al. . |
| 4,067,809 | * | 1/1978 | Kato . |
| 4,133,760 | * | 1/1979 | Ogawa . |
| 4,220,530 | * | 9/1980 | Gabriele . |
| 5,171,438 | * | 12/1992 | Korcz . |

FOREIGN PATENT DOCUMENTS

| | | |
|---|---|---|
| 49-7098 | 4/1972 | (JP) . |
| 48-80397 | 10/1973 | (JP) . |
| 51-161397 | 12/1976 | (JP) . |
| 54-15899 | 2/1979 | (JP) . |
| 58-67514 | 5/1983 | (JP) . |
| 58-128693 | 8/1983 | (JP) . |
| 58-178869 | 11/1983 | (JP) . |
| 60-39043 | 11/1985 | (JP) . |
| 62-129119 | 6/1987 | (JP) . |
| 62-282613 | 12/1987 | (JP) . |
| 4-15289 | 1/1990 | (JP) . |
| 3-91764 | 9/1991 | (JP) . |

* cited by examiner

Primary Examiner—David A. Simmons
Assistant Examiner—Fred Prince
(74) Attorney, Agent, or Firm—Finnegan, Henderson, Farabow, Garrett, & Dunner, L.L.P.

(57) ABSTRACT

A filtration device for tank water for aquarium fish having several partitions dividing the casing into several filtration chambers. A removable filtration cartridge is inserted into each filtration chamber. The cartridge has top and bottom panels with perforations formed in the panels to allow water to flow through the cartridge. The partitions are arranged in an alternating pattern. One partition has an opening near the bottom of the casing, and the partition extends to the top of the casing. The next partition does not have an opening near the bottom of the casing and the partition does not reach the top of the casing. This arrangement allows water to flow through the filtration device in a zigzag pattern. The removable cartridges allow individual filter mediums to be replaced without removing all the beneficial bacteria from the system.

8 Claims, 6 Drawing Sheets

FILTRATION DEVICE FOR TANK WATER FOR AQUARIUM FISH

TECHNICAL AREA

This invention pertains to aquarium water filtration equipment with its main focus on smaller equipment size, maximum reduction of water to filter medium contact surface and ease of filer medium installation and replacement.

BACKGROUND TECHNOLOGY

In order to successfully raise and breed aquarium fish such as goldfish, fresh water tropical fish and marine fish it is necessary to use a filter devise capable of purifying the aquarium water by trapping and breaking down debris such as fish waste and excess fish food.

Figure 6:
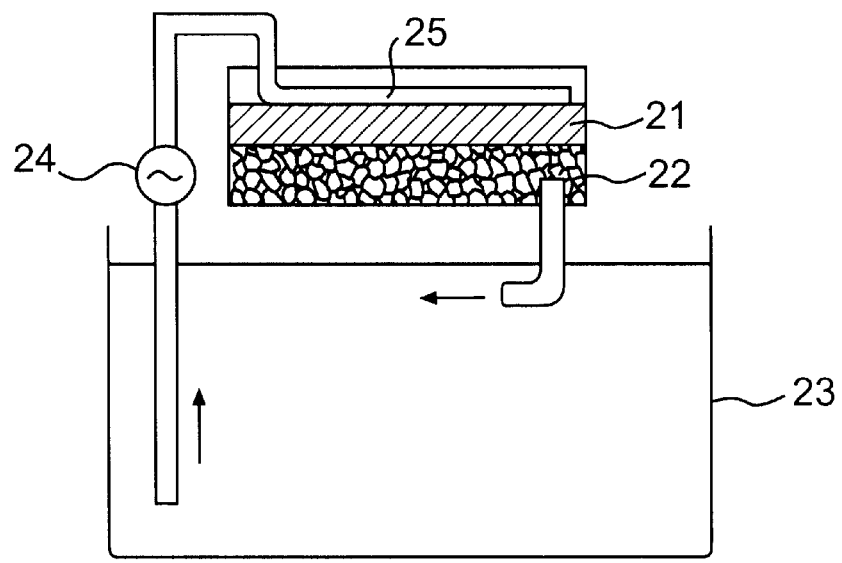

A cross section diagram FIG. 6 is an example of a conventional filtering device, commonly called the open system. Medium such as glass wool (21) and ceramic beads (22) are layered to form a filtration layer. Water in the tank (23) is siphoned by a pump (24) then passing through multiple holes (not shown) in the sprinkler head (25) and sprayed over the filtration layer. First the larger debris is trapped by the glass wool (21), next the ceramic beads (22) function as biological filter (bacteria in the medium breaks down the organic material such as fish waste, decomposing plants matte, fish food, etc. into nitrate, a harmless compound). Then the filtered water is returned to the tank (23).

System such as the ones described above is either fixed at the upper part of a tank as part of the cover or placed separately from the tank. There are several drawbacks to this type of filtration device. To accommodate larger quantity of filter medium, larger aquarium requires a larger filtration device relative to the aquarium capacity. Larger filtration device takes away from the esthetic value of an aquarium. In a larger device when the filter medium is not completely even in consistency water in the filtration device tends to follow its own narrow path instead of filtering throughout the medium, whereby causing an uneconomical and inefficiency condition called channeling. Increasing the speed of water flow through the system can make a smaller sized filtration device to function sufficiently, but the turbulence from fast flowing water may affect the fish adversely.

In order to promote the growth of necessary bacteria, the open system is designed to expose the filter surface for oxygen intake, but this allows the necessary element for plant growth, carbon dioxide, to escape and retards the growth of aquarium plants.

Further more, to keep the aquarium water consistently clean; filter medium must be cleansed or replaced regularly. In the conventional filtering device, removing and replacing specific filter medium could not be performed readily. As a result sudden and unexpected drop in the number of beneficial bacteria occurs from removal of the entire filter medium for cleaning and replacement FIG. 7, a schematic cross section diagram, illustrates another type of conventional filtration device commonly known as the sealed system. In this system, water from the tank (23) is siphoned up by a pump (24) and forced through a sealed cylinder or column (26) containing layers of several different types of filter medium (27). Similar to the aforementioned system, water will establish its own narrow path in the areas of least resistance in the filter medium (27) resulting in channeling where only a very limited portion of the filter medium is actually utilized. Difficulty in changing or cleaning the filter medium as well as the placement requirement of the device at a level below the tank (23) to insure the release of gas developing in the system are other disadvantages.

EXPLICATION OF THE INVENTION

The purpose of this invention is to design a compact sealed forced water aquarium filtration equipment that is easy to remove isolated filter medium for cleaning and replacement thus providing the solution to the problems common to the conventional aquarium filtration device.

The special design of this forced water aquarium filter system consists of a thin box shaped casing. The casing is divided vertically into several filtration chambers using partitions. Each of the multiple chambers holds readily removable cartridge of single filter medium. Water flow is designed so that the water from the tank is forced in through the top panel of the cartridge, down through the base panel, from the adjacent base panel up to the to panel in a down-up, up-down zigzag pattern.

The above water flow design successfully reduces the size of the filter system without compromising the efficiency. By directing the water flow through the medium in a zigzag pattern following results can be reached: reduction of medium to water contact surface, prevent channeling and increasing the distance of water passing through the medium.

Additionally, simplicity of removal and replacement of single filter medium for cleaning and replacement accomplished by installing cartridges for individual filter medium in each of the filtration chambers.

SIMPLE EXPLANATION OF THE DIAGRAMS

Figure 1:
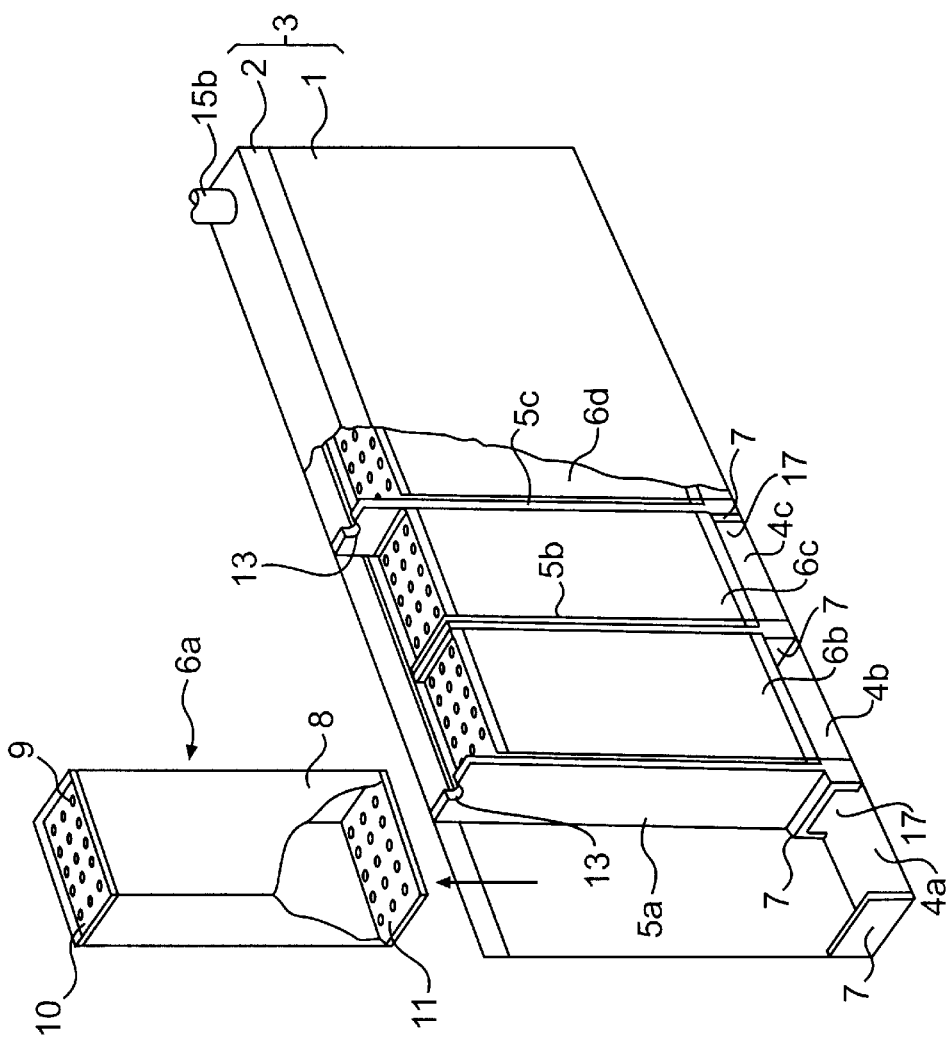
Figure 2:
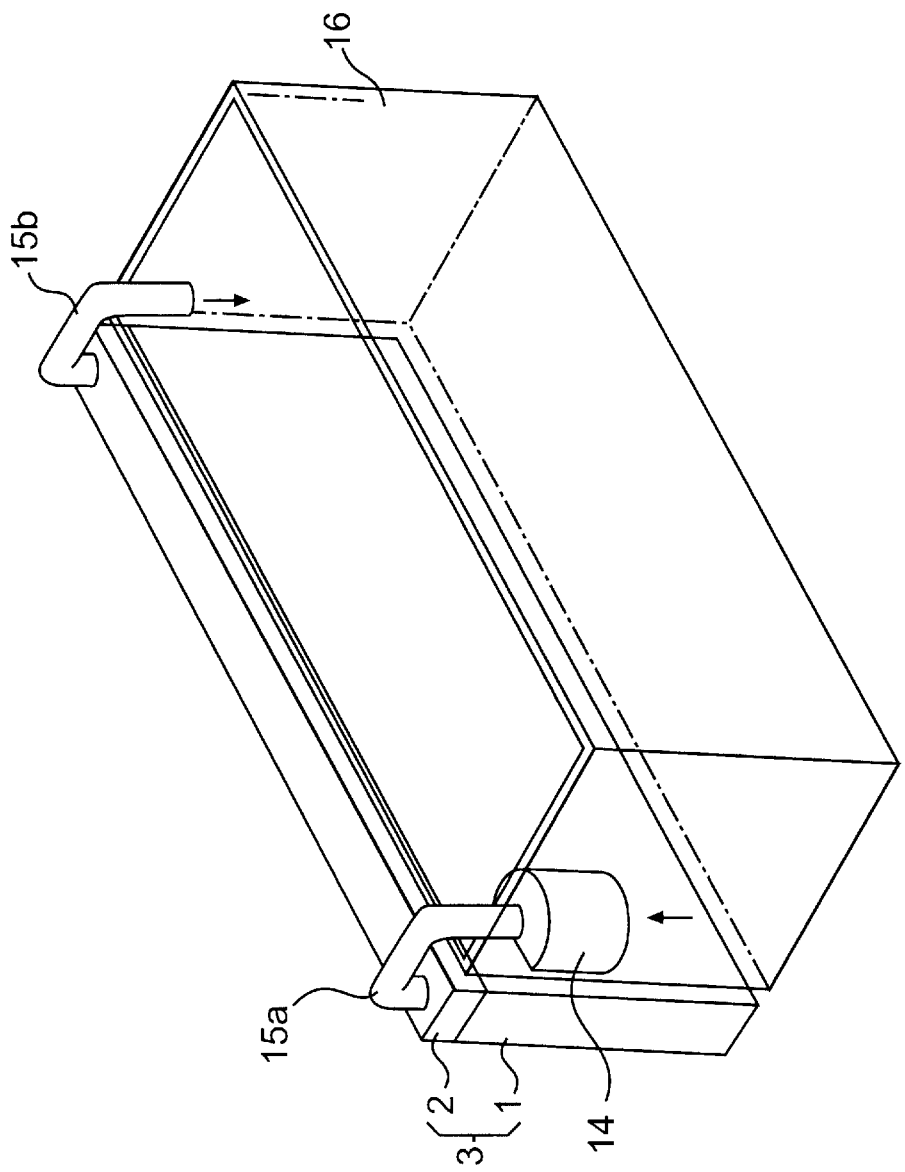
Figure 3:
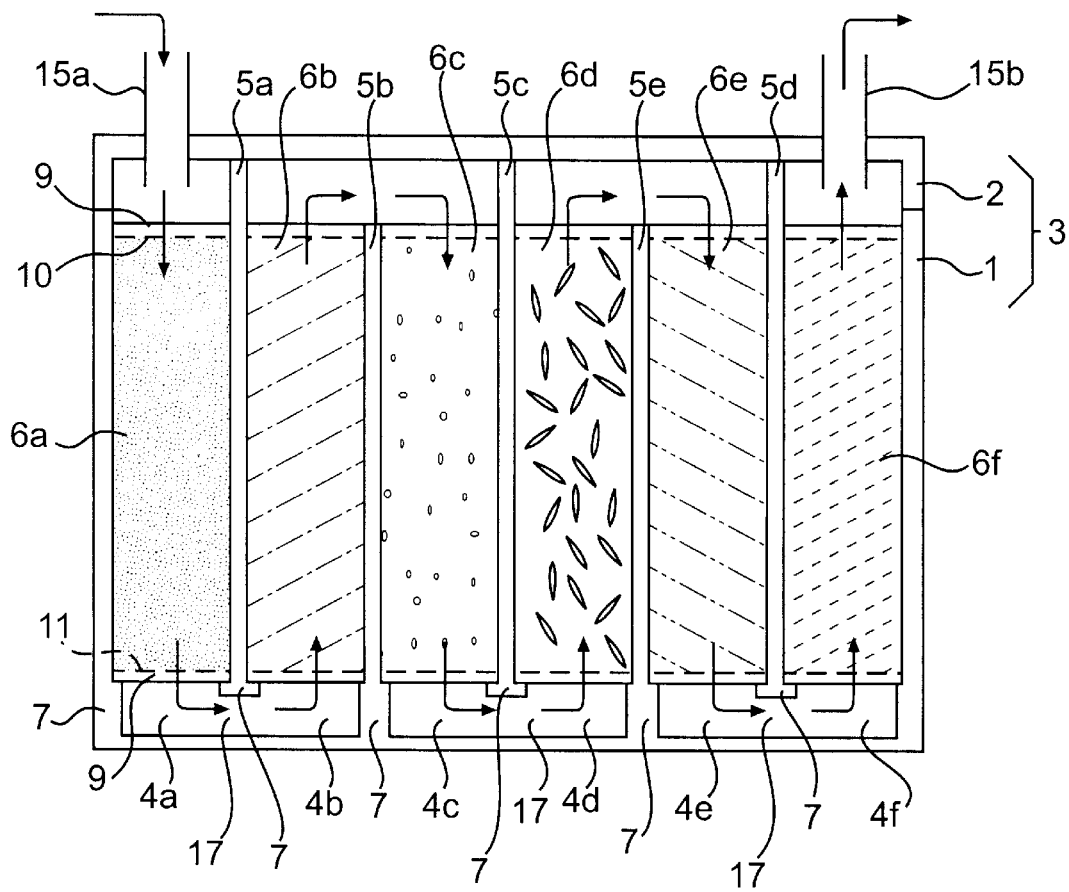
Figure 4:
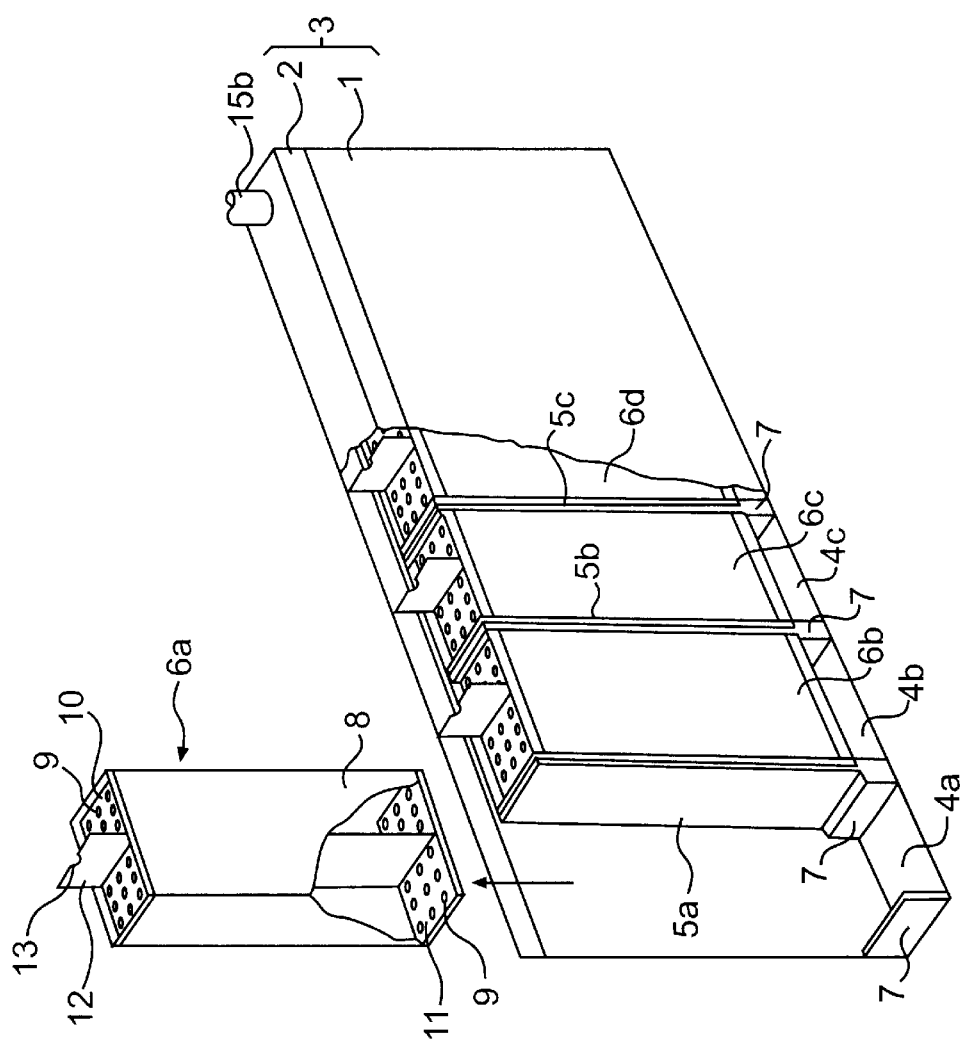
Figure 5:
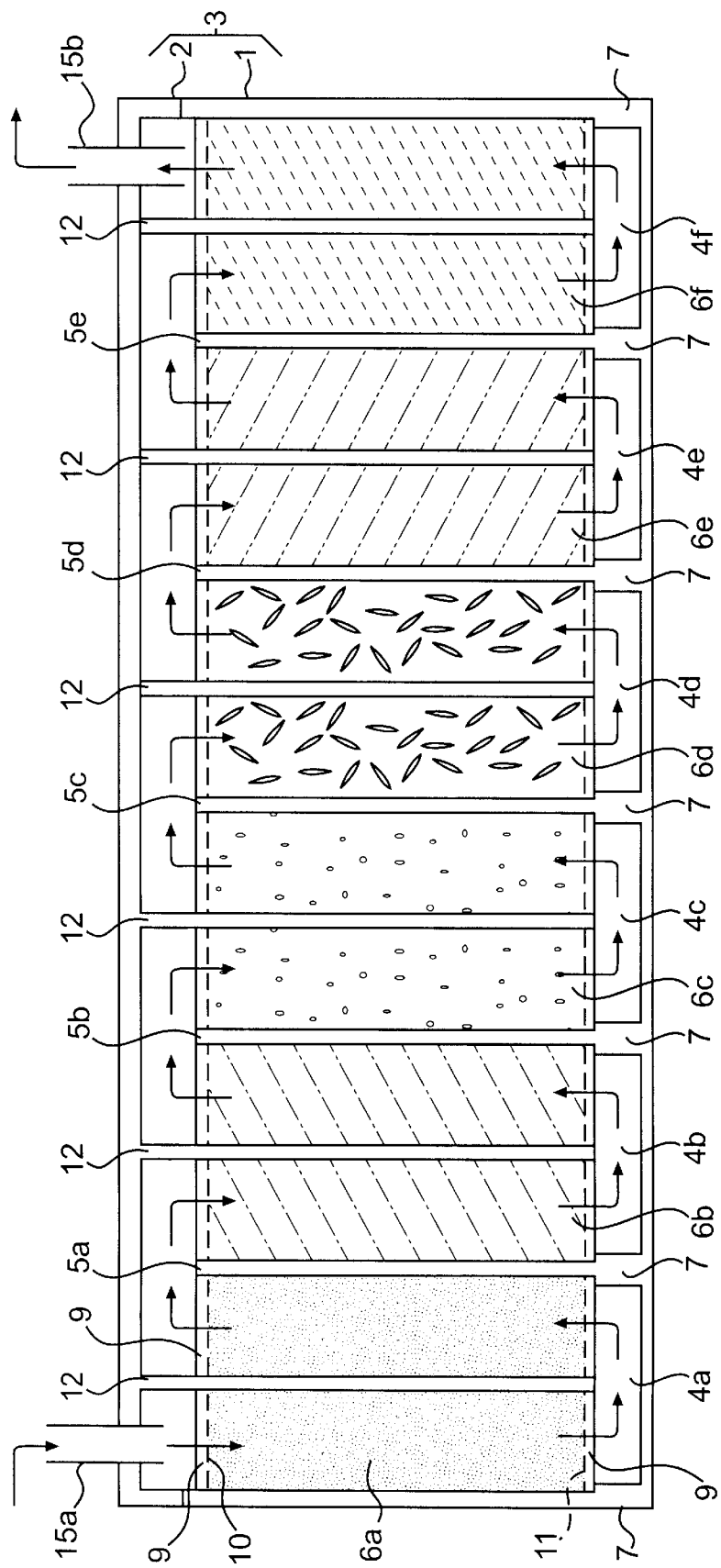
Figure 7:
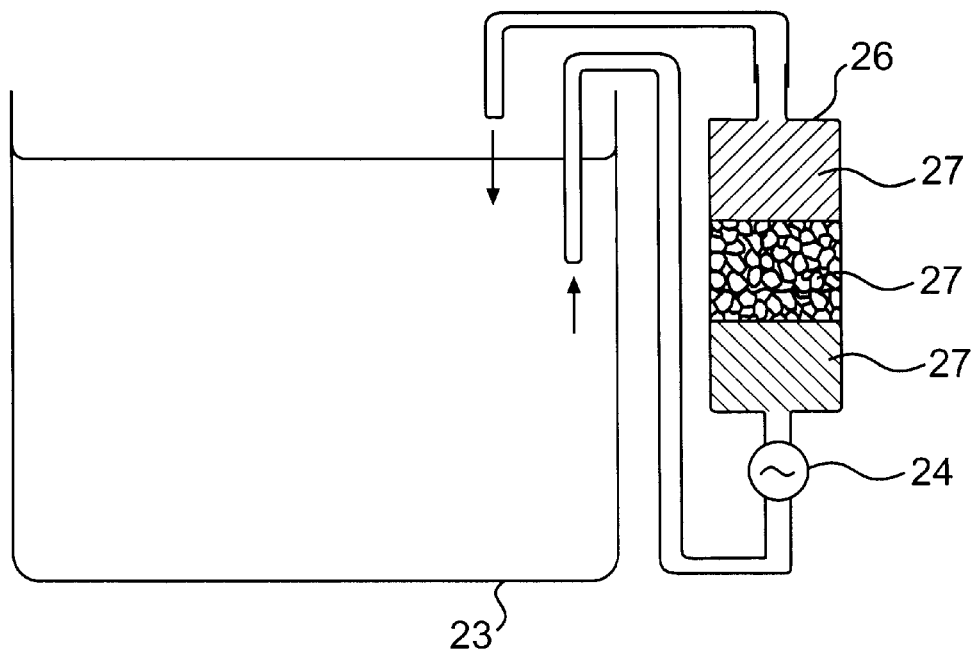

FIG. 1: sketch of aquarium filter system Example 1: partial cutaway, perspective view FIG. 2: sketch of FIG. 1 filter system installed in aquarium: perspective view FIG. 3: diagram of water flow through the interior of the FIG. 1 filter system: cross section FIG. 4: sketch of aquarium filter system Example 2: partial cutaway, perspective view FIG. 5: diagram of water flow through the interior of the FIG. 4 filter system: cross section FIG. 6: sketch of an example of conventional filtration device: cross section FIG. 7: sketch of another example of a conventional filtration device: cross section

EFFECTIVE IMPLEMENTATION OF THE INVENTION

Application Example 1

FIG. 1: a sketch showing partially cutaway perspective view of the first example of the actual application of this invention illustrating the aquarium filter equipment and FIG. 2 is a sketch of the installed filter equipment as described in FIG. 1 viewed perspectively.

This filter system consists of a two-part container (3) with an open thin box shaped casing (1) and a lid (2) to cover the opening. Within the casing are, for example six in this partial view sketch, vertical filtration chambers (4a~4f) separated by partitions (5a~5e) with three sides, base and two side edges, forming flush contact with the inside walls and the base of the casing. In each of the chambers (4a~4f) are replaceable cartridges for individual filter medium (6a~6f), partial view.

The partitions (5a~5e) for the chambers are positioned vertically in the casing (1) from the base to the lid (2) with some spacing between the top edge of the partition and the lid of the casing. There are two protruding stoppers (7), built in to the lower corners of each partition (5a~5e). Similar stoppers (7) are built on to the inside of the casing (1) at each end. Formed at the lower edge of the partitions 5a, 5c, 5e are openings (17) to allow the water to circulate. Optionally, in place of the opening (17), raising the partitions 5a, 5c, and 5e, a set distance above the base panel can create water passage. Partitions 5a, 5c, 5e are positioned higher than the partition 5b and 5d forming a flush contact with the lid (2). These each have a notched vent (13) at the upper edge to release the minute amount of carbon dioxide formed in the filtration chambers (4a~4f). Growth of helpful bacteria can be promoted by incorporating fine perforations (not illustrated) into the lower portions of the partitions 5b and 5d. This allows the oxygen rich water in the earlier stage chambers to seep into the latter chambers.

As shown in FIG. 1, the filter medium cartridge (6a) that fits inside the chambers is constructed of 4-side panels (8) and top (10) and base panel (11) with perforation (9).

All other filter medium cartridges (6b~6f) are constructed similarly to the above cartridge (6a).

Various filter medium such as glass wool, active charcoal, ceramic beads, sand, matting, sponge (not illustrated) depending on the type of fish in the aquarium, are contained separately in the cartridges (6a~6f)

As seen in FIG. 2, this filtration equipment is suspended on the rear exterior of the tank. The intake tube (15a) with the siphon pump (14) on its end and the return tube (15b) are attached close to either ends of the casing lid (2). Suspending the filter equipment behind the tank eliminates unsightly obstructions and enhances the esthetic value of the aquarium.

The following explains the functioning of the filtration equipment constructed as described above with references to FIG. 3. FIG. 3 is a cross section sketch to illustrate water flow through the system. When pump (14) is activated, water in the tank (16) flows through the intake tube (15a) and enters the filtration system. Water entering the filtration system will first flow into the medium cartridge (6a) through the perforation (9) in the top panel (10). Water is filtered as it flows through the medium in the cartridge and exits through the perforation (9) then through the opening (17) in the partition (5a). Water that flowed through the opening (17) now enters the next chamber. Next the water is forced upwards through the medium in cartridge (6b) and out through the perforation (9) in the top panel (10), then into the next cartridge (6c). The water travels through the medium contained in cartridge (6c) as it gets filtered, then flow through the opening (17) in the partition (5c) and enters the next chamber (6d). Water will flow through the partitions (5a~5e) following the pattern in the direction of the arrow in vertical zigzag pattern as illustrated in FIG. 3. When the water reaches the last cartridge (6f), it is forced up through the perforation (9) in the top panel (10) and through the return tube (15b) back to the tank (16).

The structure of this filtration system is designed so the vertical zigzag pattern of water flowing through medium cartridges (6a~6b) increases the distance of water traveling through the medium thus decreasing the necessary exposed surface area of medium. This makes it possible to reduce the quantity of filter medium needed therefore reducing the size and weight of the system without sacrificing the its capability. This filter system encourages the aquarium water plant growth by minimizing the escape of carbon dioxide into the atmosphere. When the filter system is in operation accumulation of debris will require replacement of the medium. In such case, lift the lid (2) and as shown in FIG. 1, remove the cartridge (6) by lifting it out from the filtration chamber (4) and replace it with a cartridge containing fresh medium.

Since the each medium is contained separately in the cartridge (6a~6f) replacement of specific medium is possible. Also this system allows the flexibility of selecting and arranging the filter medium based on the needs and type of fish kept in the aquarium.

Application Example 2

Another example of the application of this invention can be described using FIG. 4 and FIG. 5. To avoid unnecessary repetition of information, descriptions that are the same as that of Example 1 will be indicated as such and not repeated.

FIG. 4: sketch of aquarium filter system Example 2: partially cutaway, perspective view FIG. 5: diagram of water flow through the interior of the FIG. 4 filter system: cross section This filter system similar to the system above consists of a container (3) with casing (1) and lid (2), partitions (5a~5e), and cartridges for individual filter medium (6a~6f). The difference in this system from the previously described system is that the partitions 5a, 5c, and 5e do not have the opening (17). The upper edges of the partitions (5a~5e) are positioned at the same level. Using filter medium cartridge (6a) as an example, as illustrated in FIG. 4, the cartridge is constructed from side panel (8), perforated (9) top (10) and base (11) panels, a fixed partition (12) to divide the cartridge vertically in two equal sections. The cartridges (6a~6f) are inserted parallel to the partitions (5a~5e) into each of the filtration chambers (4a~4f). When inserted, the cartridges' position are determined by the stoppers (7), when the lid is closed over the casing the lid will form a flush contact with the upper edge of the partitions (12) in the cartridges. (6a~6f)

Following is a description of the water flow within the filtration system, as illustrated in FIG. 5; water entering the filtration system will first flow into the medium cartridge (6a) through the perforation (9) in the top panel (10). Water flows down as it is filtered through the medium in the left side of the partitioned cartridge (6a), then exits through the perforation (9) into the right hand side of the partition of cartridge (6a), then up through the perforation (9) in the top panel (10) and down into the medium cartridge (6b). Then repeats the pattern by traveling through the medium on the left side of the cartridge (6b), then right side of the cartridge and on to the next cartridge (6c). In this manner water forms a U-shaped passage through each cartridge (5a~5e) that are divided in half by partitions (12). As the arrows in FIG. 5 shows, water travels in vertical zigzag pattern throughout the filter system.

Although these are specific details of this invention this is not the limit of its application. For instance the number of filtration chamber (4) or the filter medium cartridges (6) can be modified according to the size of the tank and the type of fish. It is not necessary to insert filter medium cartridges (6) in all filtration chambers (4). Also, if the top panel (10) or the base panel (11) were made to be removable and not fixed to the attached medium cartridge (6), it is possible to remove just the medium from the cartridge for cleaning and replacing. In such case, reuse of the cartridges can be made possible.

To economize the use of space, the filtration system can be installed above or below the tank by selecting the appropriate length and shape of the in-tank tube (15a) and the return tube (15b)

Industrial Application

Application of this invention in an aquarium water filtration system makes it possible to reduce the size and weight of the equipment without reducing the effectiveness of filtration ability. This is accomplished by creating a vertical zigzag path of water flow through the filter medium and increasing the flow distance. This filter system also allows an easy access to single filter medium for replacement and cleaning purpose.

Additionally, reduced size and weight of the filter system allows the installation of the equipment out of view on the back of the tank. All these features make this filter system an ideal system for aquarium enthusiasts.

What is claimed is:

1. An aquarium water filtration system comprising:

a box-shaped casing having an opening;

a lid to cover said opening, said lid including an inlet;

a plurality of partitions in said casing, said partitions dividing the casing into a plurality of filtration chambers; and a plurality of filter medium cartridges, each of said cartridges being removably inserted into and filling one of said chambers, each of said cartridges having a top panel and a base panel, each of said top and base panels having at least one perforation formed therein, whereby water can flow from said inlet in series through the perforation in the top panel of one of the cartridges, down through perforation in the base panel of said cartridge, and be forced up from the base panel of an adjacent cartridge to the top panel of said adjacent cartridge.

2. The aquarium water filtration system according to claim 1, wherein the casing includes a base surface opposite the opening; and wherein each of said plurality of partitions has an upper edge and a lower portion, said partitions being arranged in an alternating pattern wherein the upper edge of one partition is flush with the lid, the lower portion of the one partition defines an opening for water passage, an adjacent partition has the lower portion seated flush with the base surface, and the upper edge is spaced from the lid to allow water passage.

3. The aquarium water filtration system according to claim 1, wherein each of said plurality of partitions has an upper portion adjacent the lid, and at least one of said plurality of partitions has the upper portion contacting said lid, said upper portion of said at least one partition having a pore formed therein.

4. The aquarium water filtration system according to claim 1, wherein said casing includes a base panel opposite said opening; and wherein each of said plurality of partitions has a lower portion, and at least one of said lower portions has a perforation formed therein, said at least one lower portion being seated flush to the base panel.

5. The aquarium water filtration system according to claim 1, wherein said casing includes a base panel opposite said opening;

wherein each of said plurality of partitions has an upper portion and a lower portion, said lower portion being seated flush to the base panel, said upper portion being spaced from said lid; and wherein each of said cartridges includes an additional partition located down the center of the cartridge, said additional partition having an upper edge that contacts said lid.

6. An aquarium water filtration system comprising:

a box shaped casing having an opening;

a lid to cover said opening;

a plurality of partitions in said casing, said partitions dividing the casing into a plurality of filtration chambers, each of said plurality of partitions has an upper portion adjacent the lid, and at least one of said plurality of partitions has the upper portion contacting said lid, said upper portion of said at least one partition having a pore formed therein; and a plurality of filter medium cartridges, each of said cartridges removably inserted into one of said chambers, each of said cartridges having a top panel and a base panel, each of said top and base panels having at least one perforation formed therein, whereby water can flow in a series through the perforation in the top panel of one of the cartridges, down through perforation in the base panel of said cartridge, and be forced up from the base panel of an adjacent cartridge to the top panel of said adjacent cartridge.

7. An aquarium water filtration system comprising:

a box shaped casing having an opening, said casing includes a base panel opposite said opening;

a lid to cover said opening;

a plurality of partitions in said casing, said partitions dividing the casing into a plurality of filtration chambers, each of said plurality of partitions has a lower portion, and at least one of said lower portions has a perforation formed therein, said at least one lower portion being seated flush to the base panel; and a plurality of filter medium cartridges, each of said cartridges removably inserted into one of said chambers, each of said cartridges having a top panel and a base panel, each of said top and base panels having at least one perforation formed therein, whereby water can flow in a series through the perforation in the top panel of one of the cartridges, down through perforation in the base panel of said cartridge, and be forced up from the base panel of an adjacent cartridge to the top panel of said adjacent cartridge.

8. An aquarium water filtration system comprising:

a box shaped casing having an opening, said casing includes a base panel opposite said opening;

a lid to cover said opening;

a plurality of partitions in said casing, said partitions dividing the casing into a plurality of filtration chambers, each of said plurality of partitions has an upper portion and a lower portion, said lower portion being seated flush to the base panel, said upper portion being spaced from said lid; and plurality of filter medium cartridges, each of said cartridges removably inserted into one of said chambers, each of said cartridges having a top panel and a base panel, each of said top and base panels having at least one perforation formed therein, each of said cartridges includes an additional partition located down the center of the cartridge, said additional partition having an upper edge that contacts said lid, whereby water can flow in a series through the perforation in the top panel of one of the cartridges, down through perforation in the base panel of said cartridge, and be forced up from the base panel of an adjacent cartridge to the top panel of said adjacent cartridge.

* * * * *